United States Patent [19]

Kakutani

[11] Patent Number: 5,553,166
[45] Date of Patent: Sep. 3, 1996

[54] IMAGE PROCESSING APPARATUS

[75] Inventor: Toshiaki Kakutani, Nagano, Japan

[73] Assignee: Seiko Epson Corporation, Tokyo, Japan

[21] Appl. No.: 264,364

[22] Filed: Jun. 23, 1994

[30] Foreign Application Priority Data

Jun. 24, 1993 [JP] Japan ................... 5-153566
Dec. 28, 1993 [JP] Japan ................... 5-352898

[51] Int. Cl.$^6$ ................... G06K 9/40
[52] U.S. Cl. ................... 382/252; 382/270; 382/237; 358/466/457
[58] Field of Search ................... 382/252, 237, 382/239, 270, 272; 358/466, 447, 455, 456, 457, 458

[56] References Cited

U.S. PATENT DOCUMENTS

| | | | |
|---|---|---|---|
| 5,045,952 | 9/1991 | Eschbach | 358/447 |
| 5,208,873 | 5/1993 | Nakajima | 358/466 |
| 5,268,774 | 12/1993 | Eschbach | 358/466 |
| 5,307,425 | 4/1994 | Otsuka | 382/252 |
| 5,325,211 | 6/1994 | Eschbach | 382/252 |
| 5,325,448 | 6/1994 | Katayama et al. | 382/252 |

FOREIGN PATENT DOCUMENTS

| | | | |
|---|---|---|---|
| 0481808 | 4/1992 | European Pat. Off. | G06F 15/68 |
| 0414505 | 2/1993 | European Pat. Off. | G06F 15/68 |
| 0544511 | 6/1993 | European Pat. Off. | H04N 1/40 |
| 3838730 | 5/1989 | Germany | G06F 15/66 |

OTHER PUBLICATIONS

Patent Abstracts of Japan, vol. 13, No. 376 (M–862), Aug. 21, 1989, JP–A–01 130 945 (Canon Inc) May 23, 1989 *abstract*.

Patent Abstracts of Japan, vol. 16, No. 441 (E–1264), Sep. 14 1992, JP–A–154 370 (Fujitsu Ltd) May 27, 1992 *abstract*.

*Primary Examiner*—Leo Boudreau
*Assistant Examiner*—David R. Anderson
*Attorney, Agent, or Firm*—Sughrue, Mion, Zinn, Macpeak & Seas

[57] ABSTRACT

An image processing apparatus 30, which can solve the problems of delay in dot generation in beginning portions of areas of low or high density and tailing after finishing areas of low or high density and carry out speedy binary coding image processing without accompanying side effects of quality depletion and without the need to utilize a complicated processing circuit: includes error correction unit 34 which corrects multigradation image data 200 and outputs it, threshold error setting unit which sets a binary coding threshold value based on the gradation value of said target pixel multigradation image data 200 and binary coding unit 36 which, based on the set threshold value, converts the previously mentioned corrected pixel data into the previously mentioned bigradation image data and outputs it; the gradation value of the previously mentioned target pixel multigradation image data being data, the median value of the previously mentioned first gradation value and second gradation value being m and the previously mentioned threshold value being slsh, the previously mentioned threshold setting unit 36, when the gradation value of the previously mentioned target pixel multigradation image data is in the neighborhood of the previously mentioned first and second gradation values, the binary coding threshold value is set within the tolerance range shown in the following equations:

when data< $m$, data$\leq slsh \leq (m+\text{data})/2$, when data> $m$, $(m+\text{data})/2 \leq slsh \leq$ data.

9 Claims, 14 Drawing Sheets

FIG. 1
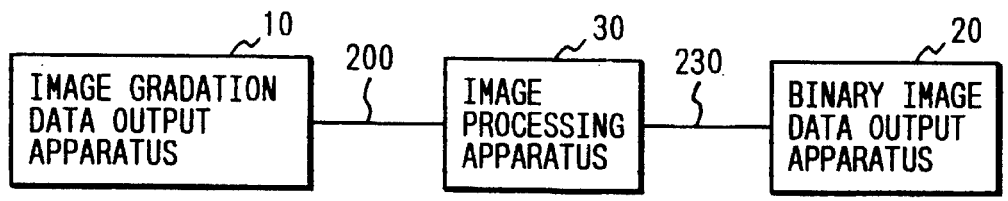
FIG. 3(a)
```
      *  3  1
1  2  3  2  1
   1  1  1
```
FIG. 3(b)
```
      *  2  1
   1  2  1
      1
```
FIG. 3(c)
```
      *  7  5
3  5  7  5  3
1  3  5  3  1
```
FIG. 4
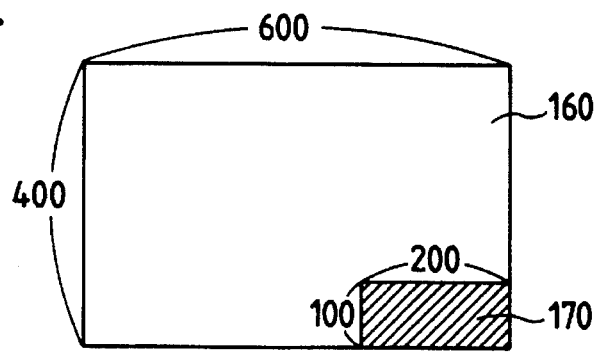

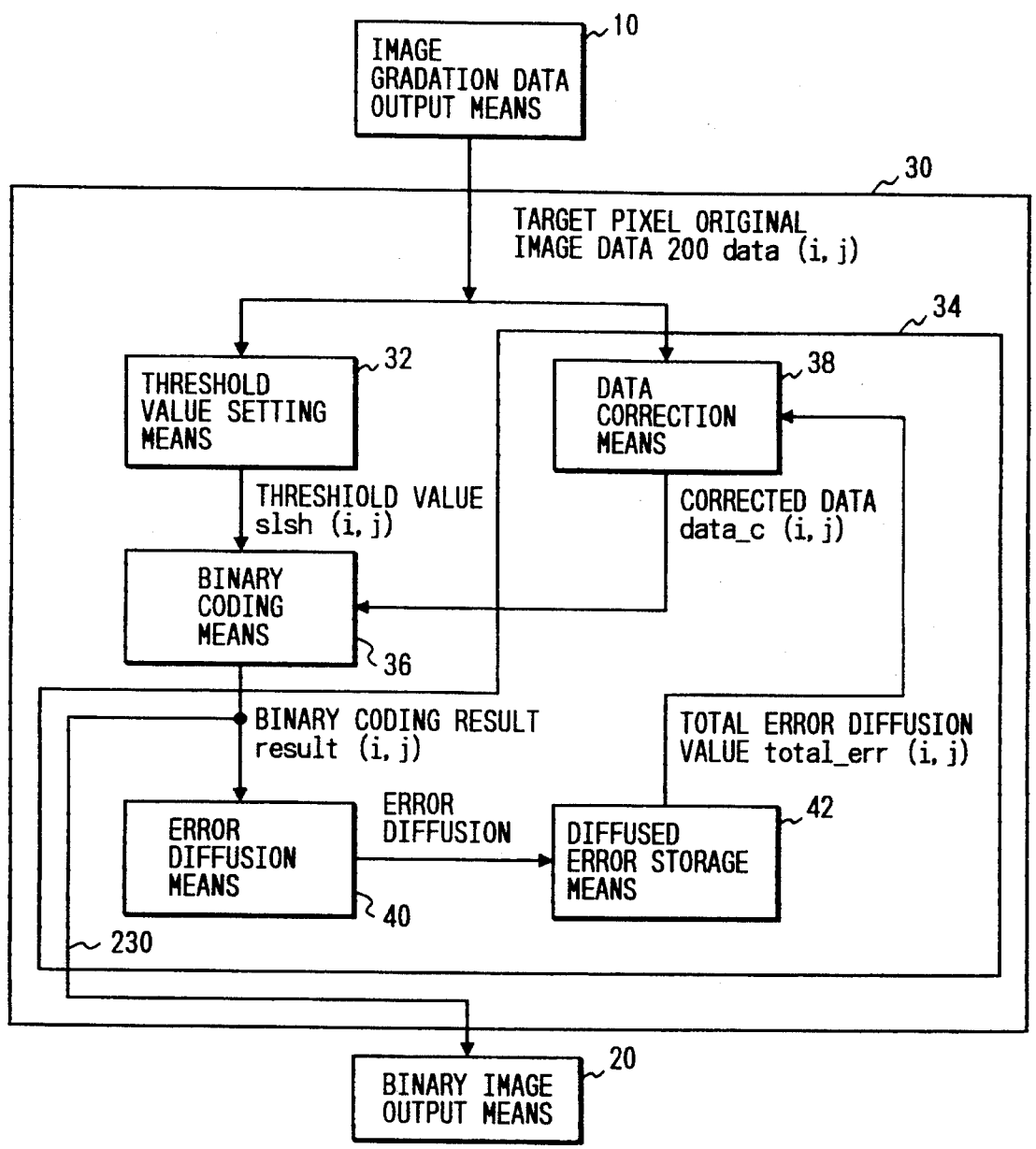

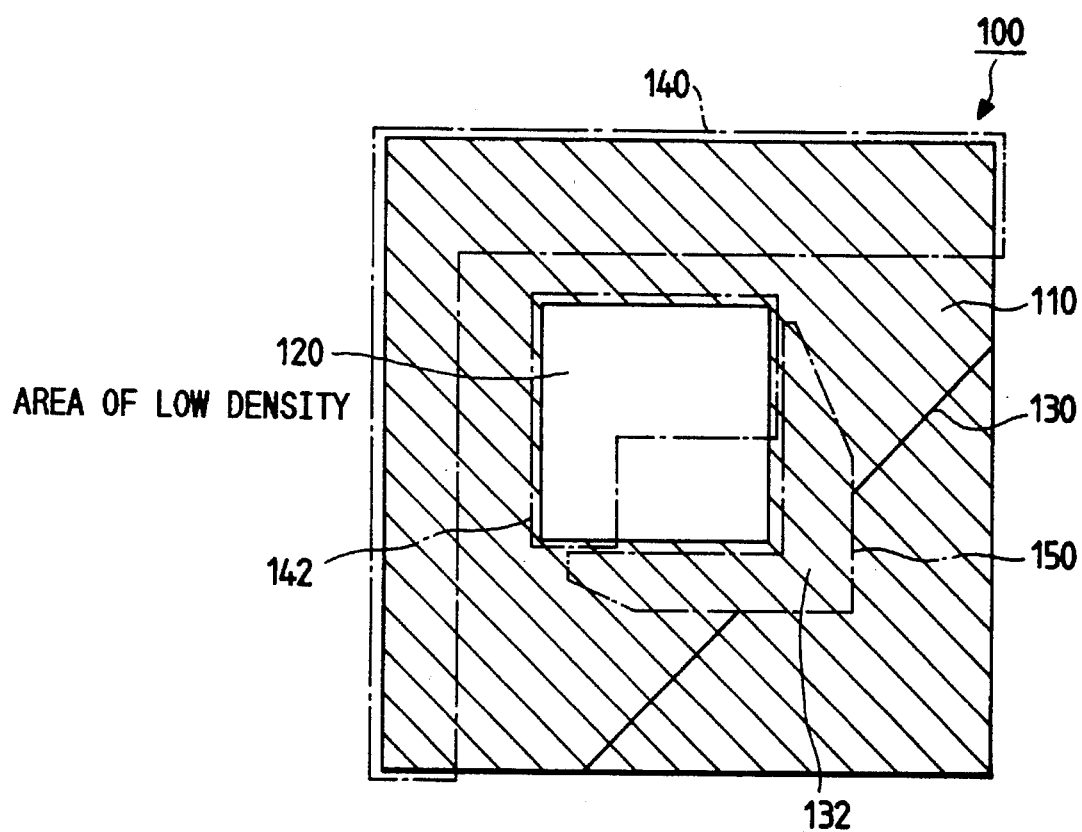

IMAGE PROCESSING APPARATUS

BACKGROUND OF THE INVENTION

The invention relates to an image processing apparatus outputting multigradation image data which has been converted into bigradation image data capable of displaying half tones. In particular it relates to improvement of an image processing apparatus using an error diffusion method or a minimum average error method.

In the past, multigradation image data read using an input from a scanner or from a computer was reproductively displayed, for example, by multigradation displays, printers, facsimiles and copies. Using these as image output apparatus to reproductively display multigradation image data posed no problem. However, in the case where a printer apparatus or a display apparatus which does not control the gradation of dot is used, it was necessary to perform binary coding processing to reduce the number of gradations of each pixel to 2 gradations.

Furthermore, in the case where the volume of the aforementioned multigradation image data was reduced in order to store or transfer it, binary coding processing was performed in the same way to reduce the number of gradations of each pixel to 2.

There are many types of techniques of binary coding. Among them, an error diffusion method and an equivalent minimum average error method are widely used as the to produce superior picture, quality. Art error diffusion method or a minimum average error method, having high resolution, has the superior characteristic of continuous gradation reproduction.

In the above-mentioned error diffusion method, a quantization error occurring during binary coding of a target is diffused and added to the proximal non binary-coded pixels. On the other hand, the minimum average error method is a method whereby the weighted average value of a quantization error occurring in previously binary-coded pixels amends the data value of the following target pixel. The error diffusion method and the minimum average error method are different only with respect to when the error diffusion operation is carried out. Logically they are the same. Unexamined Japanese Patent Publication No. Hei. 1-284173 is an example employing the error diffusion method.

However, in the previous image processing apparatus utilizing the error diffusion method and the minimum average error method, when converting multigradation image data to bigradation image data there were the following problems:

First, black dot generation in the initial part of an area of low density (an area with few black dots), and white dot generation in the initial part of an area of high density (an area with few white dots), was substantially delayed. As a result, in the worst case, the image was transformed.

Further, even after an area of low density and an area of high density were finished, there was the problem that a phenomenon (tailing) developed. In this case, the image data following the completion of an area of low density was deflected towards the high density side, and image data following the completion of an area of high density was deflected towards the low density side.

Consider the case of the first problem in a bigradational printer apparatus printing black ink dots on white paper. Because the black dots got bigger due to ink blurring, the white dots were difficult to distinguish because of blurring from the surrounding black dots. As a result, the first problem was especially noticeable in the low density portion.

The afore-mentioned problems will be discussed in detail using the drawings. FIG. 13 is an original image 100 displayed utilizing multiple gradations. Inside a high-density square area 110 with a density gradation value of 252 (highest value- 255), there is a low density square area 120 with a density gradation value of 3 (lowest density- 0).

Further, at the bottom right of the low density square area 120 a 45 degree inclined straight line with a density gradation value of 231 (slightly lower density than the 252 background density) is drawn.

In FIG. 14(A), in a previous technology utilizing an error diffusion method, the original image 100 (shown in FIG. 13.) multigradation image data binary-coded image is shown. Further, in FIG. 14(B), an outline diagram shows the position of 14(A). This binary-coded image was obtained by a repeated binary coding process, with the upper left-hand corner pixel of original image 100 as the binary coding starting point; after one line is binary coded by scanning to the right the coding moves to one pixel lower at the left-hand end and continues the process. In contrast to FIG. 14A, FIG. 12 is an example of the output in the case of ideal binary coding of the same original image 100 by the image processing apparatus of the present invention. If we compare the two, in FIG. 14 in the upper and left-hand portions of the high density square area 140, (Please refer to FIG. 14(B)) the generation of white dots was delayed. Further, in the upper and left-hand portions of the low density square area 120, delay in the generation of black dots occurred. That is, the above-mentioned first problem occurred in the portions 140 and 142. Further, due to the influence of tailing from the square-shaped low density area 120, one portion (132) of straight line 130 in the bottom right-hand area 150 disappeared. In this way, the second problem occurred in area 150.

Unexamined Japanese Patent Application No. Hei.1-130945 proposed a solution to these problems. In the first embodiment mentioned, in the case of managing from 0–255 input density data, where the input density data was between 1 and 29, the threshold value changed randomly. More specifically, where the input data was between 1–4, the threshold value was between 20–230, where the input data was between 5–14, the threshold value was between 50–200 and where the input data was between 15–29, the threshold value was between 100–150. This is the range within which the threshold value changed randomly. The random noise range was ± 105 when the data was from 1–4, ± 75 when the data was from 5–14 and ± 25 when the data was from 15–29; the result was that a large noise was added in a low density area close to 0. However, the expected values of the threshold values were all uniformally at 125. In this way the delay in dot generation was improved, because the case developed wherein when the density was low the threshold value became exceptionally small due to a large threshold value noise, and even in the transitional portion of an area of low gradation density, pixels binary coded to 255 developed.

Therefore, in the case of improving the first problem by this method, because there was exceptionally high noise in the area of low density, a low quality image resulted. Further, in this previous example a special structure called a determining circuit was provided. Using this determining circuit, if upon examination of the binary coding result of binary-coded pixels surrounding the target pixel there were already dots adjacent, a determining process was employed to determine whether the target pixels were to be binary coded. It is considered that this improves the above-mentioned problems a little.

However, in the above process, it is necessary to refer to the binary coding result of the surrounding 12 pixels. Complicated processing became necessary, and there were the problems of increased processing time and unsatisfactory picture quality. In addition to this, in this related art the improvement in the second problem was insufficient.

Still further, in the other embodiments mentioned in this related art, there are discrepancies in the way of defining a signal 410. FIG. 1 of the publication, which shows the example, is therefore difficult to correctly understand. However, as it is stated in the related art, 'it has a threshold value setting function in the same way as in the above-mentioned embodiment, moreover the scale of the hardware is small', it is considered that, as in the first embodiment, a large volume of noise was added to the threshold value in the area of low density. Accordingly, the other embodiments mentioned in this related art had the same problems as the first embodiment.

Further, as other methods of improving the aforementioned first and second problems there are proposals such as the 'Image Processing Apparatus' of Unexamined Japanese Patent Application No. Hei.3-112269, and the 'Image Forming Apparatus' of Unexamined Japanese Patent Application No. Hei.4-126464, etc. In this related art, an average density value was inferred by referencing the result of binary coding of a plurality of pixels surrounding the target pixels, and binary coding of the target pixels was carried out with the average as a threshold value. However, in this method there were the following two problems:

(1) It was necessary to reference the result of binary coding of more than 10 surrounding pixels, so there was the problem that it took a long time for processing and a complicated processing circuit was necessary.

(2) In the boundaries where the data changed suddenly, it was inappropriate to use an average density value from the surrounding pixels. The result was the problem of incorrect binary coding being performed and noise being created.

SUMMARY OF THE INVENTION

The present invention takes into account these kinds of previous problems for the purpose of obtaining an image processing apparatus (which can process multigradation image data into binary-coded image data at high-speed without using a complicated processing circuit and having no side effects involving picture deterioration) to solve problems such as delayed generation of dots in the initial portion of a low density area and high density area, and tailing after completion of an area of low/high density. In order to achieve the above-mentioned objective, the present invention comprises an image processing apparatus for converting multigradation image data into bigradation image data and uses a first gradation value and a second gradation value (gradation value< second gradation value); an error correction means for outputting corrected pixel data (corrected by adding an error diffused from surrounded previously binary-coded pixels to the target pixel multigradation image data); a threshold value setting means which sets a binary threshold value based on the gradation value of the multigradation image data of said target pixels; and a binary coding means for outputting said bigradation image data changed from said corrected pixel data based on the set threshold value; wherein, with said target pixel multigradation image data gradation value (data), the median of the above-mentioned first gradation value and second gradation value (m) and said threshold value (slsh), said threshold value setting means sets said binary coding threshold value slsh, corresponding to said target pixel multigradation image data gradation value data, and satisfying at least one of the tolerance ranges shown in the following equations:

in the case where the value of data is close to the first gradation value, data≦slsh≦(m+data)/2, and in the case where the value of data is close to the second gradation value, (m+data)/2≦slsh≦data.

Here, when said target pixel multigradation image data gradation value data is in the neighborhood of said first gradation value and second gradation value, said threshold setting means can set said binary coding threshold value slsh within one of said tolerance ranges.

Further, when said target pixel multigradation image data gradation value data is in the neighborhood of said first gradation value or second gradation value, said threshold setting means can set said binary coding threshold value slsh within said tolerance range. Still further, the invention of claim 2, wherein the threshold value setting means of claims 1–3, based on said target pixel multigradation image data gradation value data, sets said binary coding threshold value slsh according to the following equation:

$$slsh = (data*(K-1)+m)/K,$$

provided that K is a constant expressed by an integer greater than 2. Further, the invention of claim 3, wherein the threshold value setting means of claim 1, corresponding to said target pixel multigradation image data gradation value data, sets said binary coding threshold value slsh step by step.

Yet further, the invention of claim 4, wherein the threshold value setting means of claim 1, based on said target pixel multigradation image data gradation value data, sets said binary coding threshold value slsh according to the following equations:

$$\text{when } data < m-L1, \ slsh = data+L1,$$

when $m-L1 < data < m+L2$, $slsh = m$, when $m+L2 < data$, $slsh = data-L2$ provided that L1, L2 are constants expressed by integers between 0 to m.

Yet further, the invention of claim 5, wherein the binary coding means of claims 1–4 adds random noise to the set threshold value or said corrected pixel data and performs said binary coding processing on said corrected pixel data.

Further, the invention of claim 6, wherein said error correction means of claims 1–5, including: a diffused error storage portion to store the diffused error total value of each pixel; an error diffusion portion which calculates the binary coding error of the corrected pixel data and binary coding result, diffuses that binary coding error to the non binary-coded pixels proximate to the target pixels using an error diffusion method, finds a new diffused error total value for each pixel by adding the diffusion error from said target pixels to the diffused error total value of each proximal pixel stored in said diffused error storage portion and updates the diffused error total value of each pixel stored in said diffused error storage portion; and a data correction portion which calculates said corrected pixel data by adding the target pixel multigradation image data and the target pixel diffused error total value stored in said diffused error storage portion; corrects the multigradation image data of the target pixels using an error diffusion method and outputs corrected pixel data.

Further, the invention of claim 7, wherein said error correction means of claims 1–5, including:

an error storage portion which stores each pixel error;
an error calculation portion which calculates the binary coding error of the corrected pixel data and binary coding result and stores that binary coding error in said error storage portion;

a data correction portion which calculates said corrected pixel data by finding an average error by reading the binary coding error of the pixels proximate to the target pixels stored in said error storage portion and applying a predetermined weighting and adding this average error to the target pixel multigradation data; corrects target pixel multigradation image data using an minimum average error method and outputs corrected pixel data.

Multigradation image data is input into the error correction means and the threshold value setting means. The error correction means corrects the target pixel data by adding the error diffused from proximal already binary-coded pixels and outputs this as corrected pixel data. Said threshold value setting means sets the binary coding threshold value based on the target pixel multigradation image data gradations. At this time, when the gradation value data of the target pixel multigradation image data takes a value at least close to the first gradation value or a second gradation value of the image, the binary coding threshold value slsh is set within the range shown in the following equations: when data is a value close to the first gradation value, then data≦slsh≦ (m+data)/2, when data is a value close to the second gradation value, (m+data)/2≦slsh≦data. Further, the threshold value setting means, based on the set threshold value, changes said corrected pixel data into bigradation image data capable of displaying half tones composed of only the first gradation value and the second gradation value, and outputs that data.

In this way, in the present invention, when the multigradation image data value is small, the threshold value is small, when the image data value is large, the threshold value is also large. In this way, by optimizing the binary coding threshold value corresponding to the gradation value of the target pixel multigradation image data, the accumulation of errors accompanying binary coding can be eliminated and generation of target pixel dots can be satisfactorily performed. Further, in the present invention, in the case of binary coding processing utilizing an error diffusion method or a minimum average error method being performed, even if the binary coding threshold value was changed, it was confirmed that the overall output density generally did not fluctuate.

As explained above, in the present invention, the phenomenon of accumulation of a large number of errors in areas of low density and areas of high density is eliminated and the problems of delay in the generation of dots in the beginning portion of an area of low density and high density and tailing after completing an area of low density and an area of high density (the development of which was caused by these errors) is essentially solved without any accompanying side effects of quality depletion.

BRIEF DESCRIPTION OF THE DRAWINGS

FIG. 1 is an outline explanatory diagram of the image processing system applied to the present invention;

FIG. 2 is a functional block diagram of an image processing apparatus in which the image processing system shown in FIG. 1 is utilized;

FIGS. 3(a)–(c) are explanatory diagrams of actual examples of diffusion weighting matrices used in the embodiment;

FIG. 4 is an explanatory diagram showing the original image data used to find the average binary coding error and the relationship with the average binary coding error discovery area;

FIGS. 14(A) and 14(B) are explanatory diagrams of a binary coding result obtained by a related art error diffusion method;

DESCRIPTION OF THE PREFERRED EMBODIMENTS

Figure 5:
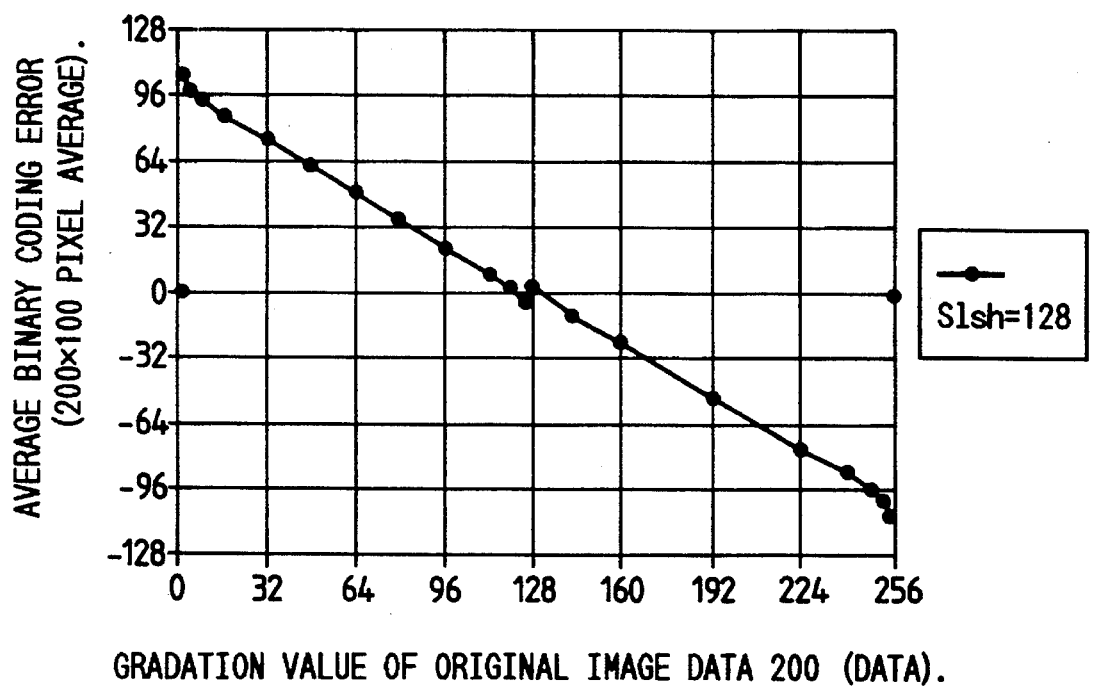
FIG. 5 is a diagram showing the relationship between the gradation values of the original image data and the average binary coding error.

The preferred embodiments will be described with reference accompanying the drawings.

Overall Explanation of the System

In FIG. 1, the outline of a system utilizing the image processing apparatus of the present invention is shown. Original image multigradation image data 200, output from image gradation data output apparatus 10 is input to image processing apparatus 30. Image processing apparatus 30 changes the gradient value of the input original image multigradation image data 200 into 2 gradations reproducible by the binary image output apparatus 20 and outputs it. That is, the multigradation image data 200 is corrected utilizing an error diffusion method or a minimum average error method, it is changed into bigradation image data 230 capable of displaying half tones composed of only the first gradation value and second gradation value and is output. Binary image output apparatus 20 reproduces and outputs the original image from the bigradation image data output from image processing apparatus 30.

In the present embodiment said image gradation data output apparatus 10 is formed utilizing a computer. This computer is constructed in such a way that the multigradation image data 200 stored in a hard disk or the like is output to image processing apparatus 30. Said multigradation image data 200 is represented as 256 gradation density data from 0–255. Still further, this image gradation data output apparatus 10 apart from this is good for outputting, for example, computer graphic multigradation image data. Apart from computers, various means,—for example scanners and video cameras—can also be utilized. In addition, the image processing apparatus 30 in this embodiment changes the input 256 gradation image data by error diffusion into bigradation image data 230 composed of only 0 (white) and 255 (black), and outputs it. Further, binary image output apparatus 20 in the present embodiment is constructed utilizing a printer which does not control the gradation of pixel units and, based on the input bigradation image data 230, it reproduces and outputs original image data in half tones. The binary image output apparatus 20, apart from printers, may utilize displays, facsimile apparatus or digital copiers.

Actual System Example

Figure 15:
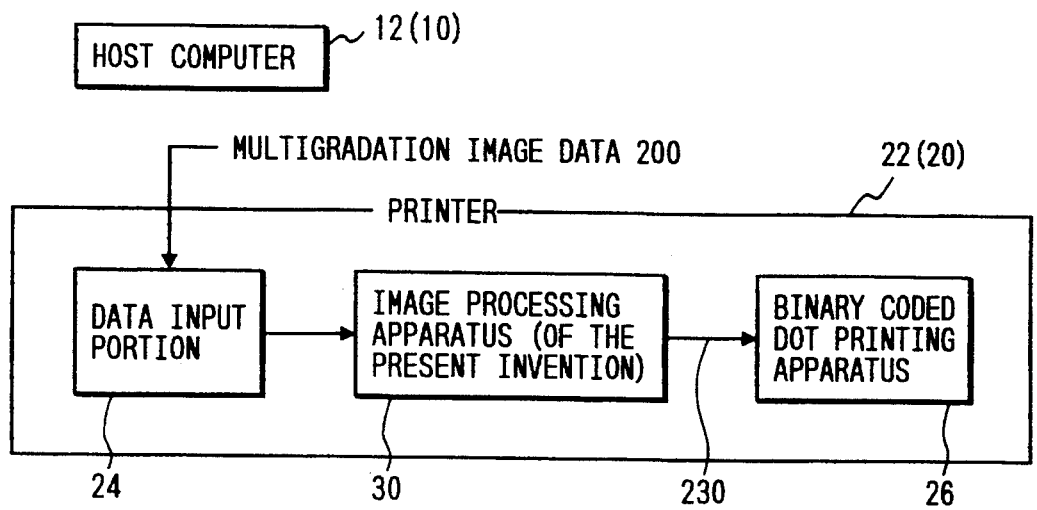
FIG. 15 is a complete outline explanatory diagram of the image processing system incorporated within the image processing apparatus of the present invention.

The image processing apparatus 30 in the present invention can be constructed equally effectively with the image gradation data output apparatus 10 and binary image output apparatus 20 in separate units or integrated in one body. For example, as shown in FIG. 15, in the case of utilizing a host computer 12 as the image gradation data output apparatus 10 and utilizing a printer 22 as the binary image output apparatus 20, it is suitable for the image processing apparatus 30 of the present invention to be integrally constructed within printer 22.

Figure 16:
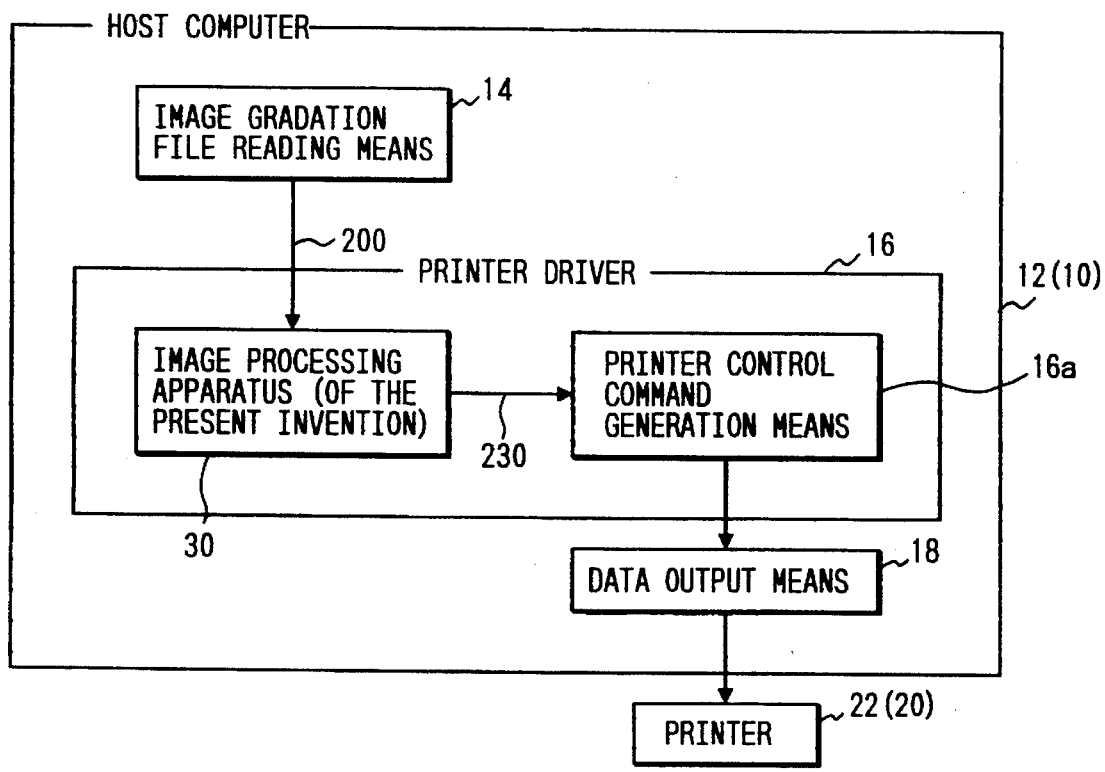
FIG. 16 is an explanatory diagram of another embodiment of the system in FIG. 15.

Further, as shown in FIG. 16, it is also suitable for the image processing apparatus 30 of the present invention to be integrally constructed within host computer 12. In this case, host computer 12 is constructed including image gradation file reading means 14, printer driver 16 and data output means 18.

In addition, said printer driver 16 (including image processing apparatus 30 of the present invention which receives multigradation image data 200 from image gradation file reading means 14 and printer control command generating means 16a which generates printer control commands based on the output of image processing apparatus 30) is constructed in such a way as to control printer 22 based on the printer control commands.

Figure 17:
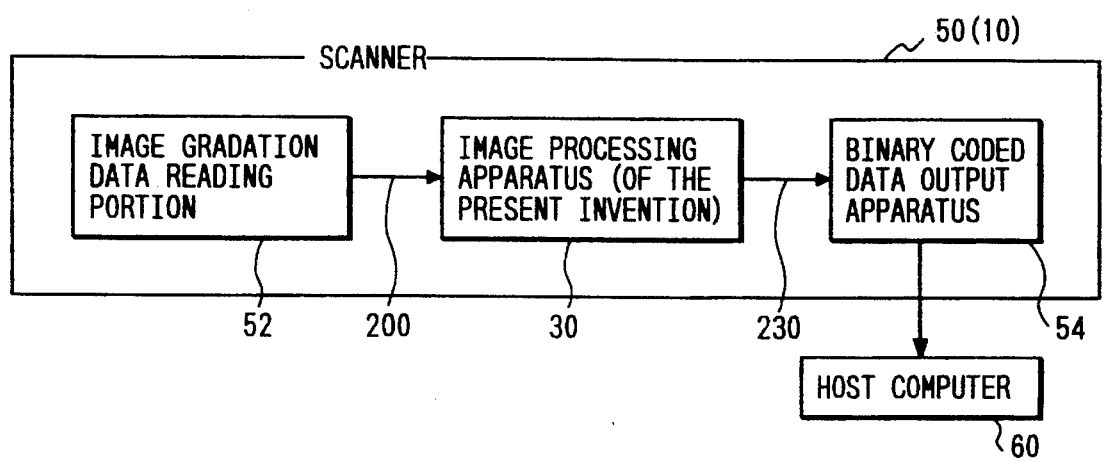
FIG. 17 is an explanatory diagram of another embodiment of the system in FIG. 15.

Moreover, as shown in FIG. 17, in the case where scanner 50 is utilized as image gradation data output apparatus 10 and multigradation image data read by this scanner 50 is output as binary coded data to host computer 60, it is suitable for the image processing apparatus 30 of the present invention to be integrally constructed within scanner 50. In this case, scanner 50 is constructed including image gradation data reading portion 52 which reads images optically, the image processing apparatus 30 of the present invention which outputs the read multigradation image data 200 as bigradation image data 230 and binary coded data output portion 54 which outputs the output bigradation image data 230 to the host computer.

If necessary, the image processing apparatus 30 of the present invention can be integrally constructed within apparatus other than those mentioned above.

For the sake of convenience, in the following explanation, the construction wherein the image processing apparatus 30 of the present invention is constructed with image gradation data output apparatus 10 and binary image output apparatus 20 as separate units, as shown in FIG. 1, is explained.

Image Processing Apparatus

In FIG. 2, the function block diagram of said image processing apparatus 30 is shown. The image processing apparatus of the embodiment is constructed including optimum threshold value setting means 32, error correction means 34 and binary coding means 36. The data (i, j) of pixel P [i, j] in line i, row j is input to said optimum threshold value setting means 32 and error correction means 34 as the target pixel multigradation data 200. Said optimum threshold old value setting means 32 sets slsh (i, j), used to binary-code the multigradation image data 200 of target pixel P [i, j], corresponding to the multigradation image data (i, j), based on the following equation:

$$slsh\ (i,j) = (data\ (i,j)*(K-1)+128)/K \quad (1)$$

here, K is a constant represented by an integer larger than 2.

Said error correction means 34 corrects the multigradation image data 200 of target pixel P [i, j] utilizing an error diffusion method based on the binary coding error generated by the binary coding of the adjacent pixels and outputs it as corrected pixel data c (i, j) to the binary coding means 36.

Binary coding means 36 compares the input corrected pixel data c (i, j) of target pixel P [i, j] with the threshold value slsh (i, j) and binary codes it, outputting the result of this binary coding, result (i, j) as bigradation pixel data 230. The corrected pixel data is binary-coded and output in the following way:

$$\text{if data\_c}(i,j) \geq slsh(i,j),\ \text{then result}\ (i,j)=255$$

$$\text{if data\_c}(i,j) < slsh(i,j),\ \text{then result}\ (i,j)=0, \quad (2)$$

The error correction means of said embodiment is constructed including data correction means 38, error diffusion means 40 and error diffusion storage means 42. Said error diffusion storage means 42 stores the total error diffusion value total err (n, m) of each pixel of the original image.

The error diffusion means 40 first finds the binary coding error err (i, j) from the binary coding result (i, j) and the corrected data c (i, j) in the following way:

$$err(i,j) = data\ c(i,j) - result\ (i,j) \quad (3)$$

Next, this binary coding error err (i, j) is diffused to and divided among the surrounding non binary coded pixels P [m, n] (P [i, j+1], P [i+1, j] etc.). Concretely speaking, the diffused part from the present target pixel P [i, j] is added to the total error diffusion value total err (n, m) of each surrounding pixel stored in the error diffusion storage means 42. An error diffusion weighted matrix as in FIG. 3(a) is used. The asterisk * in FIG. 3 shows the target pixel. The total value of the weighting is 16, and the binary coding error in the present pixel (as a fraction of 16), corresponding to the position of the pixel which is the object of the distribution, is added to total_err (m, n) after multiplication by the weighted value in the fashion shown below:

total err$(i,j+1)$=total err$(i,j+1)$+err$(i,j)$*3/16 total err$(i,j+2)$=total err$(i,j+2)$+err$(i,j)$/16 total err$(i+1,j-2)$=total err$(i+1,j-2)$+err$(i,j)$/16 total err$(i+1,j-1)$=total err$(i+1,j-1)$+err$(i,j)$*2/16 total err$(i+1,j)$=total err$(i+1,j)$+err$(i,j)$*3/16 total err$(i+1,j+1)$=total err$(i+1,j+1)$+err$(i,j)$*2/16 total err$(i+1,j+2)$=total err$(i+1,j+2)$+err$(i,j)$/16 total err$(i+2,j-1)$=total err$(i+2,j-1)$+err$(i,j)$/16 total err$(i+2,j)$=total err$(i+2,j)$+err$(i,j)$/16 total err$(i+2,j+1)$=total err$(i+2,j+1)$+err$(i,j)$/16   (4)

By the above process the error diffusion involved in binary coding of the target pixel is finished. The above process is repeated with each binary coding result output from binary coding means 36. If necessary, apart from this, FIGS. 3(b) and (c) can be utilized as examples of each type of such error diffusion weighted matrices.

Next, the multigradation image data (i, j) of target pixel P (i, j) is input to the data storage means 38, and the total error diffusion value total err (i, j) corresponding to target pixel P (i, j) is read from diffusion error storage means 42. Using these inputs, data c(i, j) is found.

Binary coding of the whole image is carried out by performing the following operation on all the pixels:

data $c(i,j)$= data $(i,j)$+ total_err $(i,j)$   (5)

Solution of First and Second Problems

In this way, the image processing apparatus 30 of the embodiment, using an error diffusion method, translates the input target pixel multigradation image data 200 into bigradation image data 230 capable of displaying half tones, comprising gradation values 0 and 255, and outputs it.

The special characteristic of the image processing apparatus 30 of the present embodiment is that the problem of a large volume of binary coding errors accumulating in areas of low density and areas of high density is solved by utilizing the optimum threshold value setting means 32, and the problems of delay in the generation of dots in the beginning portions of low and high density areas and tailing after low and high density areas are completed caused by such error accumulation are also solved.

The following is an explanation of the reason why both the above-mentioned first problem (delay in dot generation) and second problem (tailing) in the image processing apparatus of the present invention are solved. The inventor of the present invention first determined the cause of the above-mentioned first and second problems. In order to do this, in the image processing apparatus shown in FIG. 2, the optimum threshold value setting means 32 set the binary coding threshold value at 128. Furthermore, as image data 200, image data was input with all pixels having a uniform gradation value. Then the average value of the binary coding error err (i, j) added to the original image data by the above-mentioned Equation 5 was checked.

To be precise, the optimum threshold value setting means 32 was removed from the image processing apparatus of the embodiment shown in FIG. 2 and the binary coding threshold value was fixed at roughly 128. Next, as shown in FIG. 4, an original image 160, 600×400 pixels in size, with all pixels of a uniform gradation, was binary coded starting from the top left-hand corner. Then, when the dot formation was considered to have reached a stable condition, the average binary coding error (the average value of the binary coding error err (i, j) added to the original image data by Equation 5) of the 200×100 pixel area 170 in the bottom right-hand corner was found.

It is noted that the threshold value was not completely fixed at 128. With the object of avoiding the generation of a specific, regular pattern, a small amount of random noise was added in the range plus/minus 6. This noise was added to avoid the regular generation of a pattern as the original data which in the case of the present example, was computer-generated artificial data.

FIG. 5 shows the results of the above experiment conducted on original image 160 with different gradation values. From the experiment results we can clearly see that in the original image 160, in the low density areas with a gradation value 1–4, and also in the high density areas with a value of 251–254, the average binary coding error didn't become 0. On the contrary the absolute value even reached as high as 100. The average binary coding error corresponded to the expected values of error diffusion/accumulation volume in a stable state. Because the error diffusion method was thought to be a method of lowering the localized average value of the binary coding error, the large size of the absolute value obtained in this way was a deeply interesting discovery.

From the experimental data shown in FIG. 5, it is possible to analyze the generation mechanism of the previously-mentioned first and second problems in the following way.

1. In the case where the gradation values of the original image 160 are 1–8 and 247–254, (close to 0 or 255) with the threshold value fixed at around 128, before settling in a condition where dots are stably formed, a large volume error accumulation (with the absolute value of the average binary coding error reaching over 80) is necessary. Especially with original image data with gradation values of 1–4 and 251–254, it is necessary to accumulate a volume of errors over 100 before settling in a condition where dots can be formed stably. When the density values of the multigradation image data 200 are close to binary density values 0 and 100, this error accumulation volume becomes large.

2. Error Accumulation Period.

Further, in the case where the image data density is around 0, even with 0 binary coded only a few binary coding errors develop. Due to this, a considerable amount of accumulation time with diffusion and accumulation is necessary to reach a value of around 80–100. Yet further, in the case where the image data density is around 255, in the same way, a considerable amount of accumulation time with diffusion and accumulation is necessary to reach a value of around 80–100. Moreover, the accumulation speed becomes slow when the image data density values as binary coded density values are close to 0 and 255.

3. First Problem

Dots are not formed during the period of error accumulation up to when the accumulation volume has reached a stable state. For this reason, a large error accumulation volume is necessary in order to form dots. Moreover a considerable amount of time becomes necessary to reach the necessary error accumulation volume, delay in dot generation develops. This is the cause of the first problem.

4. Second Problem

As a large error accumulation volume is necessary in order to form dots, the surrounding image data is distorted by the large volume of accumulated errors being diffused as far as the exterior area. This is the cause of the second problem, the previously-mentioned problem of 'tailing'.

As stated above, in the case where the image data density values as binary coded density values are close to 0 and 255, the average binary coding error takes an unusually high absolute value and the 'error accumulation' phenomenon develops. This 'error accumulation' phenomenon is the cause of the development of the first and second problems.

The optimum threshold value setting means 32 of the present invention gets rid of this 'error accumulation' primary cause and is an essential solution to the first and second problems. It is a means wherein when the original image data 200 is low density, the threshold value is small; when it is high density the threshold value is large. Optimizing the binary coding threshold value corresponding to the original image data 200 gets rid of the 'error accumulation' itself, dot formation is possible with no 'error accumulation'.

Here, the question "Don't the 255 (black dot) binary coded pixels increase, and doesn't the density rise substantially if the threshold value of the low density area is made small without regard to the result?" probably arises. Certainly, in an ordinary dither method where error diffusion is not performed, a change in the threshold value leads to an immediate change in the density. However, when the inventor of the present invention checked this, even if the threshold value was changed in the error diffusion method, the total output density hardly changed.

That is, in the case where binary coding was carried out with the threshold value fixed at 128, and the cases where binary coding was carried out with it fixed at 64 and 192, the output density hardly changed.

In the error diffusion method the binary coding error is not discarded. Rather, it is diffused to the adjacent non binary-coded pixels. For example, even if the situation develops whereby a pixel previously binary coded to 0 is binary coded to 255 because of the threshold value being made small, a greater negative binary coding error than the absolute value is created in the pixel. This is diffused to the adjacent non binary-coded pixels and it works in a lowering direction to balance the adjacent pixel gradation level.

Figure 6:
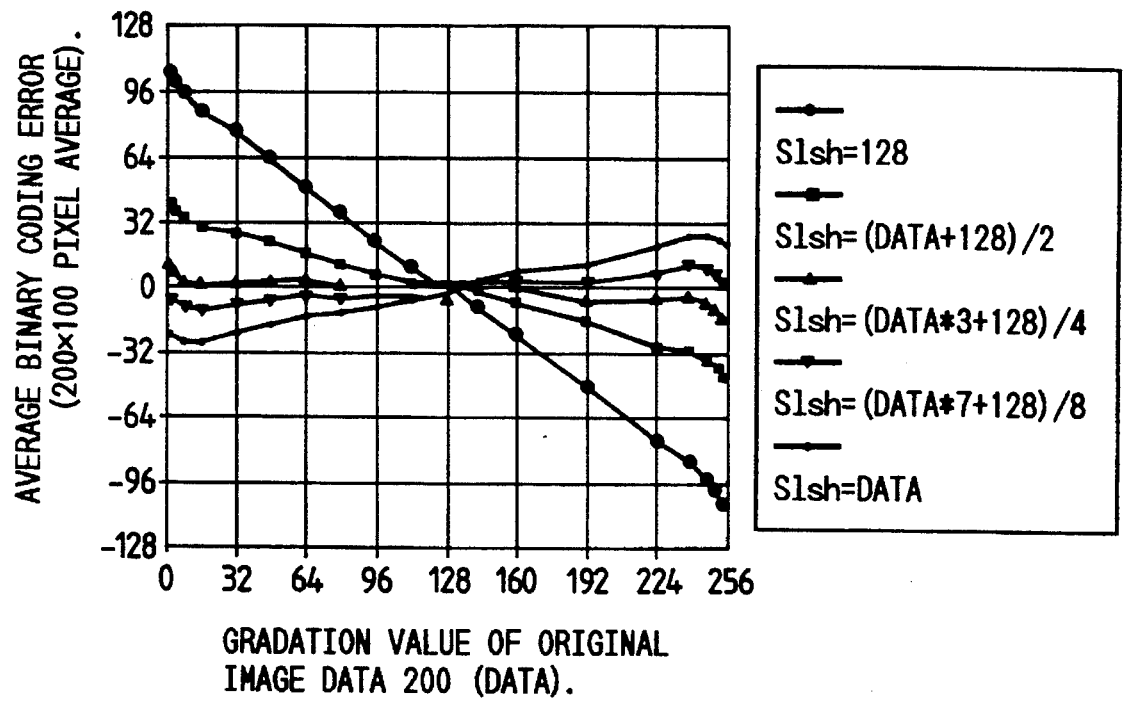
FIG. 6 is a diagram explaining how the average binary coding error is generated in the first embodiment of the present invention.

In FIG. 6 the result of removing the 'error accumulation' in the present embodiment is shown. That is, FIG. 6 is a figure clarifying what became of the average binary coding error found in the same way as in FIG. 5. In the case where the optimum threshold value setting means 32 of the present embodiment was used, the results for different values of K in equation (1) of the present embodiment was plotted.

In the case where K= ∞, slsh= data. However, in FIG. 6, in the same way as in FIG. 5, a maximum ±6 small volume of random noise was added to the threshold value determined by Equation (1). From FIG. 6 we can understand that, if K=2, that is slsh= (data+ 128)/2, the average binary coding error is reduced to less than half (at the maximum less than 50), with the result that the accumulated error volume is greatly reduced. Furthermore, if K=4, the average binary coding error is generally close to 0; when K=8, even in the case with image data gradations of 1, 2 and 253, 254 (gradation values extremely close to 0 or 255), the average binary coding error almost becomes zero.

Based on bi-gradation data output from image processing apparatus 30 shown in FIG. 1, actual printing using a printer was performed, and an evaluation of the influence of the previously-mentioned second problem 'tailing' was conducted. The result of this evaluation experiment was that it was possible to confirm that if the absolute value of the average binary coding error is kept below 50, the effect of the 'tailing' of problem B is substantially alleviated. From this, the value of K from the previously-mentioned Equation 1 is set in a range of K=2 to ∞. In other words, the threshold value corresponds to the image data gradation value, when data<128, data≦$slsh$≦(128+data)/2, when data>128, (128+data)/2≦$slsh$≦data (6)

by setting this range the absolute value of the average binary coding error can be reinstated below 50, and the second problem can be solved.

Next, an experiment was conducted to evaluate the influence of the previously- mentioned first problem, dot generation delay. The result of the evaluation experiment was that it was possible to confirm that solving the slowness in dot generation of the first problem also followed the reduction of the average binary coding error. If K from the previously-mentioned Equation 1 is made too large, the average binary coding error exceeds 0, the signal is reversed, and an 'over-correction condition' develops.

Figure 7:
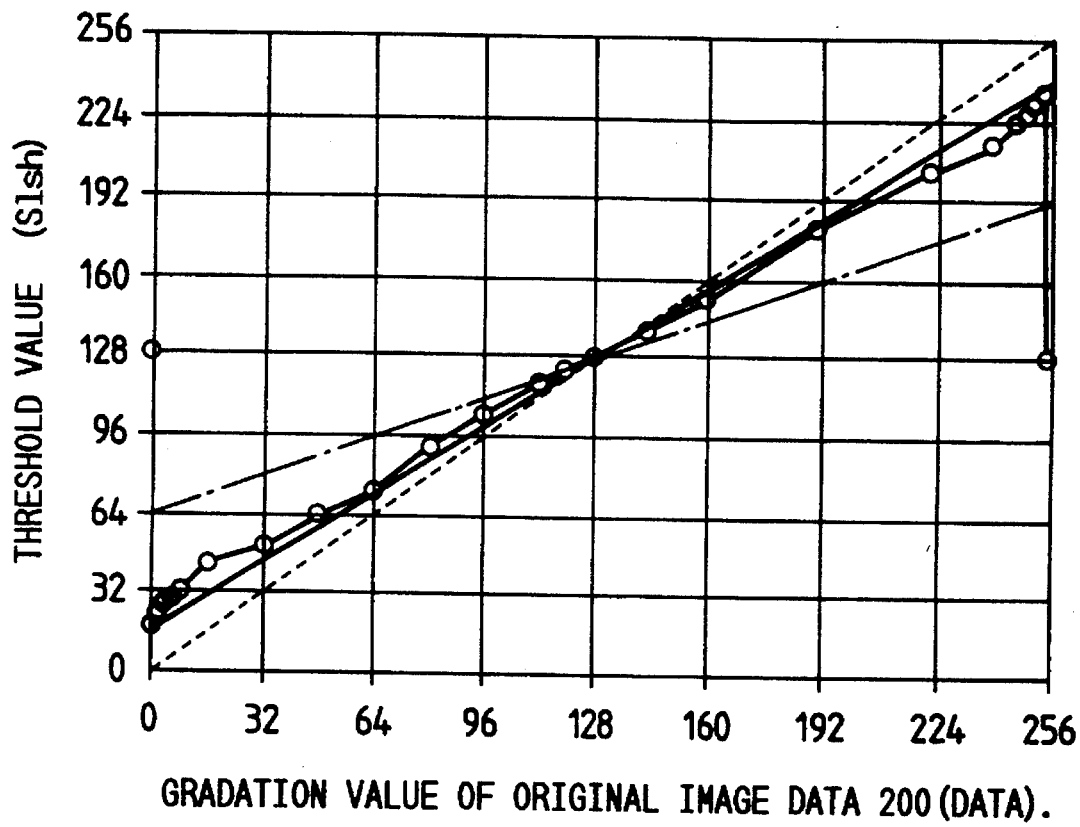
FIG. 7 is an explanatory diagram of the binary coding threshold value with the average binary coding error continuously at 0.

However in a subjective evaluation of actual print results, there were signs of the speed of dot generation accelerating up to a condition of slight over-correction, and an intensified printing effect developed, giving a desirable print quality. In the subjective examination considering the reproducibility of the slow dot-generating area with the data values at 1, 2 and 253, 254, the range of K= 8–24 was especially good, with K= 16 being the optimum level. In FIG. 7, the binary coding threshold value with the average binary coding error continuously at 0 is shown. The estimated value of this binary coding threshold value was found by interpolative computation based on FIG. 6.

If the optimum threshold value setting means of the present embodiment are constructed by deciding the threshold value from the original image data based on FIG. 7, the expected value of the 'tailing' of the previously-mentioned second problem becomes 0, and the best optimum threshold value setting means is realized.

In FIG. 7, the characteristics diagrams for lines for the cases whereby the value of K (in Equation 1) is 2, 8 and ∞, are depicted. We can understand from the characteristic curve that in the case whereby the value of K is set around K= 8, this gives an ideal approximate value for making the average binary coding error 0.

Further, in the manner previously stated, from the point of improvement of the delay in generation of dots in the previously-mentioned first problem, there was the case wherein when there was the tendency for reversal of the signal (over-correction condition) where the average binary coding error exceeded 0, a good subjective evaluation was obtained. The optimum result was obtained when K=16 was used. Up to K= ∞, there is a considerable edge intensifying result in the data changing portion, this is also sufficiently valuable for the objective of using an image.

Further, in FIG. 7, even though we made the optimum threshold value 128 when the data values were 0 or 255, no matter how we made the threshold value, the great difference in the result (when the data gradation value and binary coding result values were equal) disappeared. Accordingly, even in the optimum threshold value setting means of this embodiment, where the data values are 0 or 255, it is satisfactory whichever way the threshold value is set.

In this way, in the present embodiment, using an error diffusion method, multigradation image data 200 was converted into bigradation image data 230 (capable of displaying half tones) and output. Also, the previously mentioned first and second problems could be fundamentally solved without any accompanying side effects of quality depletion. This is achieved by the binary coding threshold value used in the binary coding processing being set within the range of the previously mentioned Equation 6, based on the gradation values of multigradation image data 200.

Moreover, in the present embodiment, through the setting method of the constant K in Equation 1 it was possible to obtain a binary-coded output image with desirable characteristics.

Further, in the corrected data shown in FIGS. 6 and 7, there is an example of the case of error diffusion using the error diffusion weighting matrix shown in FIG. 3. In the case of using different weighting matrices, quantitatively speaking a slightly different result is obtained, but the qualitative tendency generally doesn't change. In this way, the present invention is effective even in the case of utilizing a different error diffusion weighting matrix.

Comparison between the Present Invention and the Related Art

In the same way as the present invention, the 'Image Processing Apparatus and Method of Same' of Unexamined Japanese Patent Application No. Hei. 4-154370 changes the binary coding threshold value corresponding to the gradation values of the original image data 200. However, as the primary object of this method was control of noise in character and line image portions, it employed the process of 'if the original image density data is large, the corresponding binary coding threshold value is made small'. This changes the threshold value in a way exactly opposite to that of the present invention, and there was generally no effect of improving the first and second problems. Further, for an example of a binary coding method utilizing a minimum average error method it would also be useful to refer to Unexamined Japanese Patent Application No. Hei. 4-154370.

Figure 12:
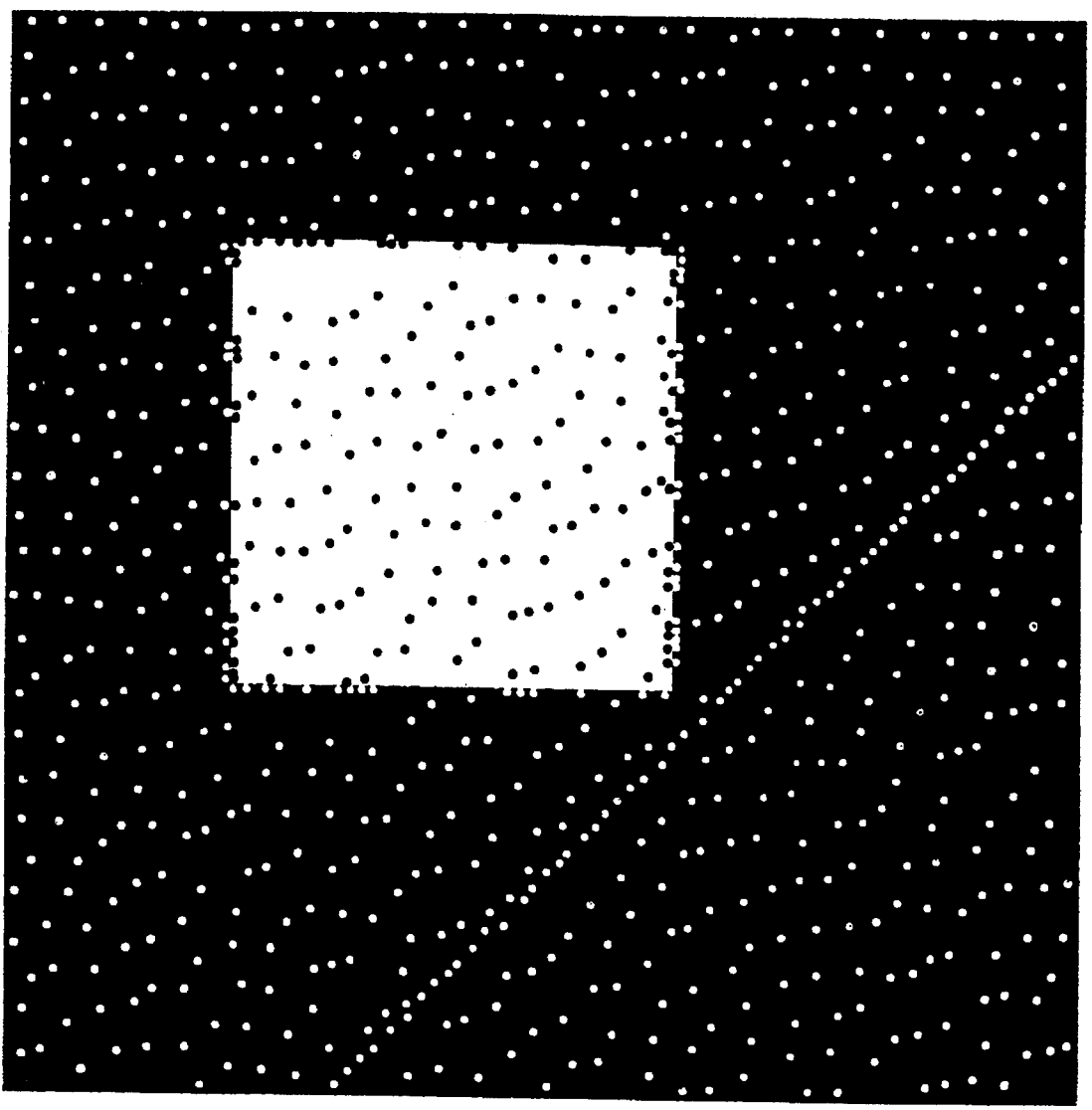
FIG. 12 is an explanatory diagram of the binary coding result used in the image processing apparatus of the present invention.
Figure 13:
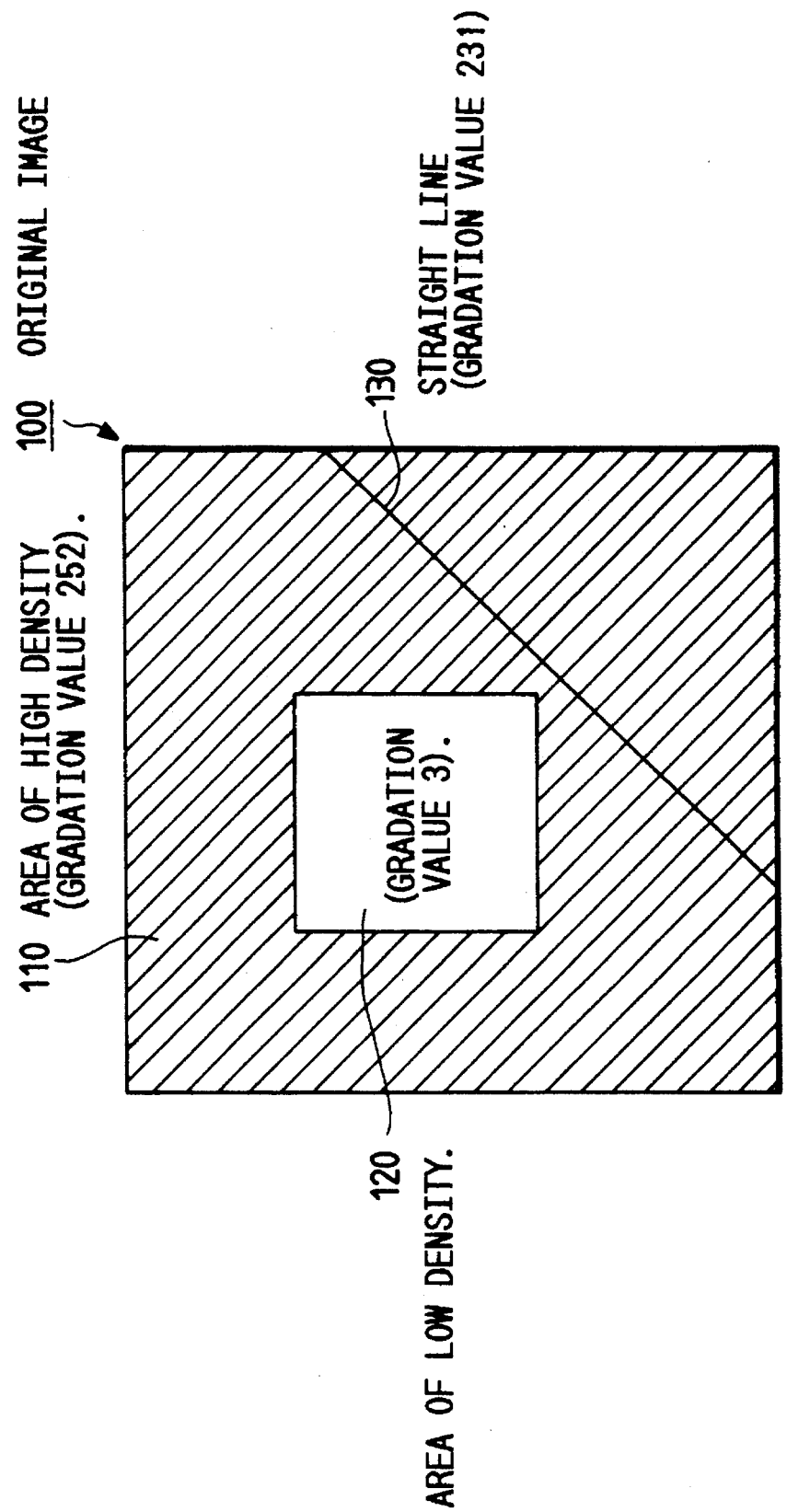
FIG. 13 is an explanatory diagram of the original image used to obtain the binary coding image showed in FIGS. 12 and 14(A), 14(B)
Figure 14A:
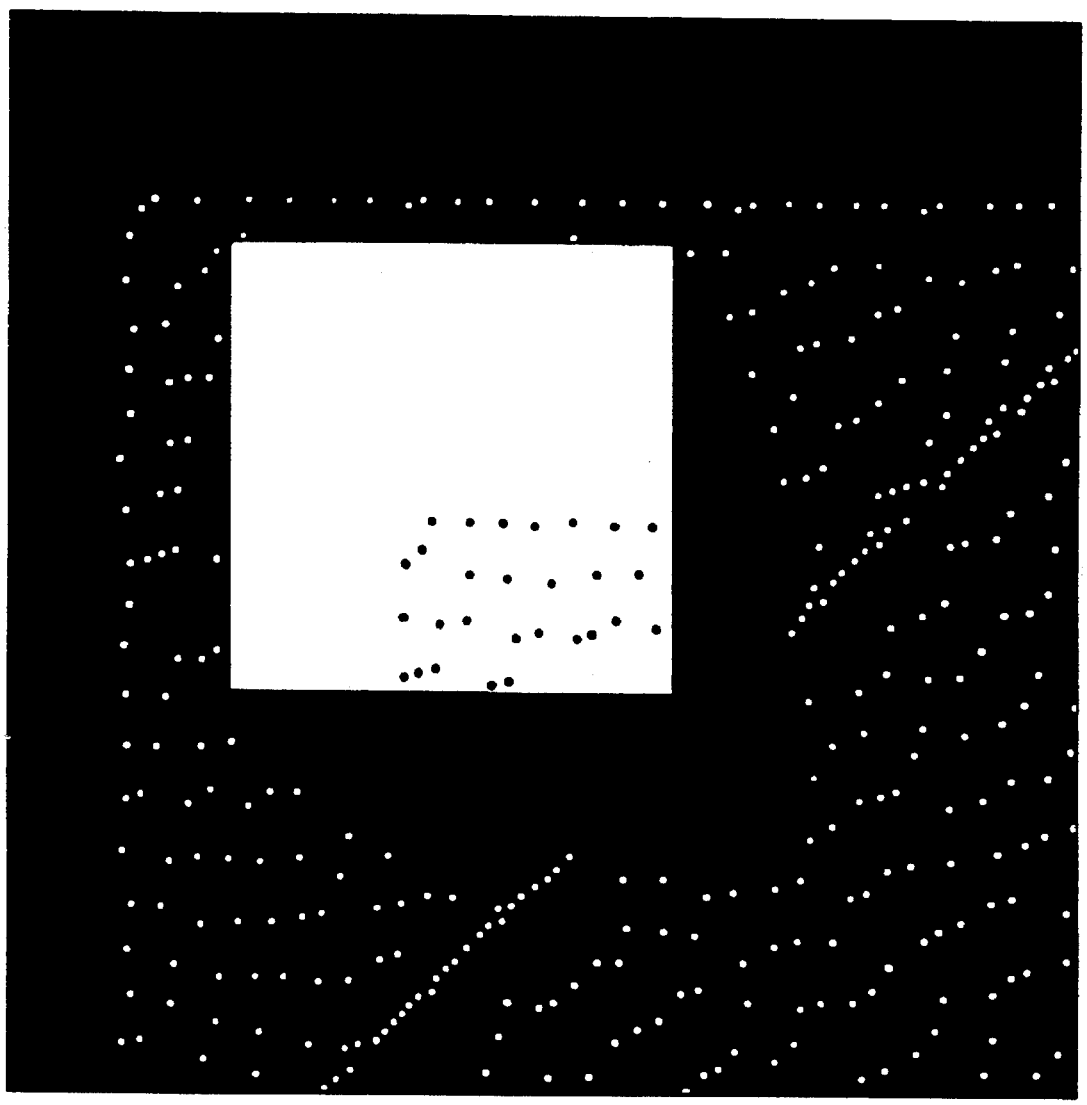

FIG. 12 is a diagram showing an output example of original picture image 100 of FIG. 3 utilizing the image processing apparatus 30 of the present invention as shown in FIG. 2. The complete solution of the dot generation delay problem of FIG. 14 and such problems as the disappearance of the central portion of straight line 130 due to tailing from low density area 120 can be understood.

In this way, the ideal solution of the first and second problems by the present invention is confirmed. Furthermore, the ability of the present invention to solve the first and second problems without any damaging side effects is also confirmed.

Other Embodiments of the Optimum Threshold Value Setting Means

In the previously mentioned embodiment, the optimum threshold value setting means 32 set the binary coding threshold value based on Equation 1. The present invention is not limited to this. Depending on the situation, it is also possible to employ other methods to set the binary coding threshold value.

Figure 8:
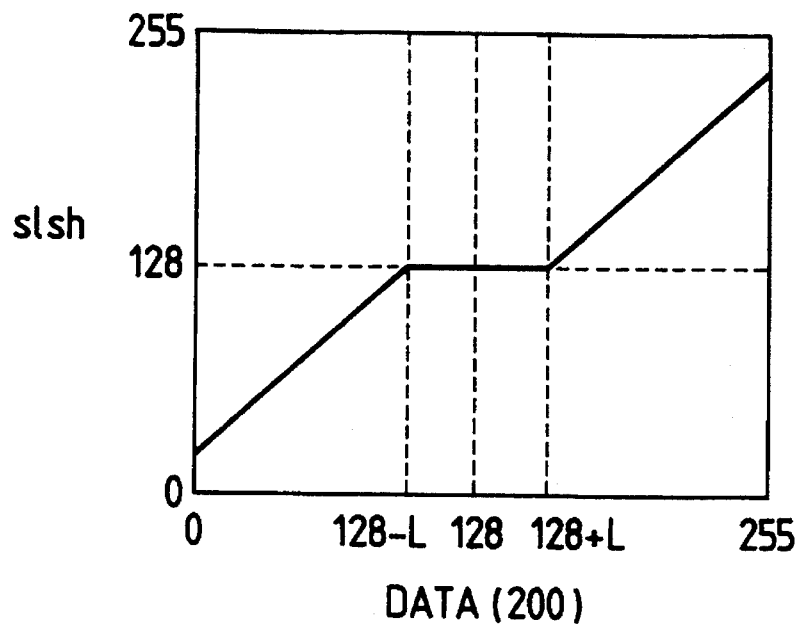
FIG. 8 is an explanatory diagram of another embodiment of the threshold setting means utilized in the present invention.
Figure 9:
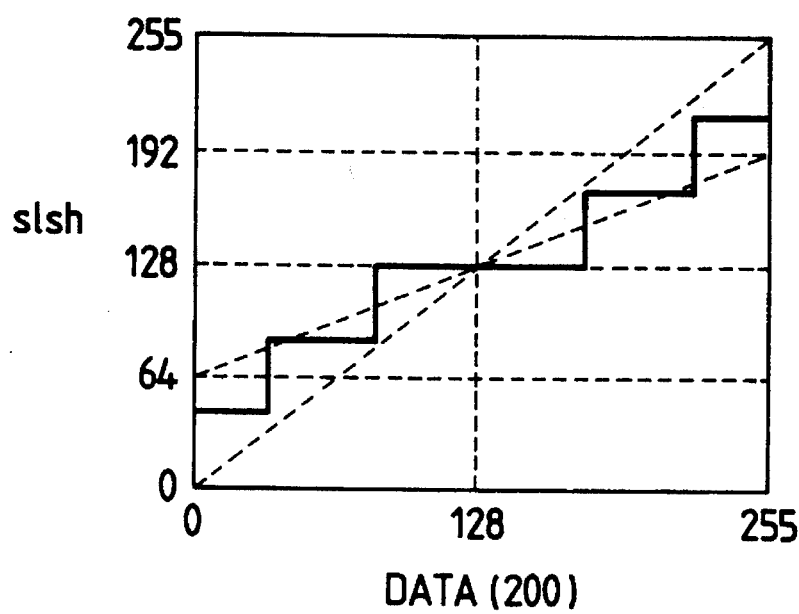
FIG. 9 is an explanatory diagram of another embodiment of the threshold setting means utilized in the present invention.

In FIG. 8 another embodiment of optimum threshold value setting means 32 is shown. The optimum threshold value setting means 32 of this embodiment is constructed setting the threshold value based on output data (i, j) as target pixel multigradation data 200, as shown in the following equations:

if $0 \leq \text{data}(i,j) < 128-L1$, $slsh(i,j) = \text{data}(i,j)+L1$, if $128-L1 \leq \text{data}(i,j) \leq 128+L2$, $slsh(i,j) = 128$, if $128+L2 < \text{data}(i,j) \leq 255$, $slsh(i,j) = \text{data}(i,j)-L2$ \hfill (7)

An appropriate value for L1, L2 is 0–64, but a range between 8–16 is optimum. Further, it is acceptable to set L1 and L2 at the same value. In this embodiment, the case wherein the data value is around 128, it deviates from the range shown in Equation 6:

when data<128, $\text{data} \leq slsh \leq (128+\text{data})/2$, when data>128, $(128+\text{data})/2 \leq slsh \leq \text{data}$ but the first and second problems to be solved by the present invention became especially conspicuous in the case wherein data is of a value in the neighborhood of 0 and 255 (not including 0 and 255). Consequently, Equation 6 does not need to be satisfied in all the data areas, it is enough if it is satisfied in the case whereby data is of a value in the neighborhood of 0 and 255. Therefore, according to the setting of the binary coding threshold value as shown in the previously mentioned Equation 7, it is possible to solve the first and second problems and to obtain a satisfactory binary-coded image in the same way as in the previously mentioned the first embodiment.

Figure 10:
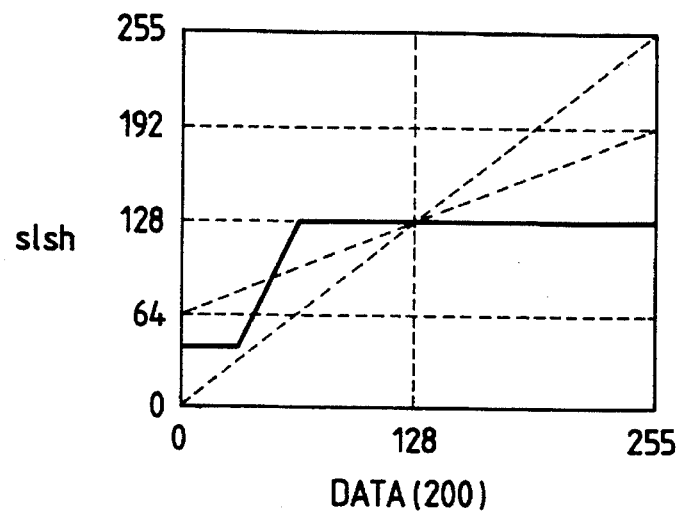
FIG. 10 is an explanatory diagram of another embodiment of the threshold setting means utilized in the present invention.

In FIG. 8, a further separate embodiment of the optimum threshold value setting means 32 is shown. In the optimum threshold value setting means 32 of the embodiment a binary coding threshold value is set corresponding to the gradation value of original image data 200 not continuously, but step by step. Even this way, it is possible to solve the first and second problems and to obtain a satisfactory binary-coded image in the same way as the previously mentioned embodiment.. Still further, in FIG. 10 yet another separate embodiment of the optimum threshold value setting means 32 is shown. The optimum threshold value setting means 32 of the embodiment is constructed such that the optimum threshold value setting operation, which is a characteristic of the present invention, operates only in the low density area. That is, it is constructed in such a fashion that in the case wherein the threshold value of image data 200 is in the high density area, the binary coding threshold value is fixed at 128; when the image data 200 is at a value close to 0 on the low density area side, the optimum threshold value is set to satisfy the previously mentioned Equation 6. For example, in a printing apparatus with a large volume of dot blurring, because isolated white dots in high density portions are generally lost, in high density portions the first problem does not appear to be so conspicuous. For that reason the present invention only improves the low density portions where the first problem is easily noticeable. Further, in response to the special characteristics of image output apparatus, it is acceptable to construct it in the opposite way such that the optimum threshold value setting operation of the present invention works only in the high density area. In this way, in response to this output apparatus, it is enough to construct the optimum threshold value setting means 32 of the present invention to set the optimum threshold value only in the necessary original image high density portions.

Actual Example of the Threshold Value Setting Means

Figure 11:
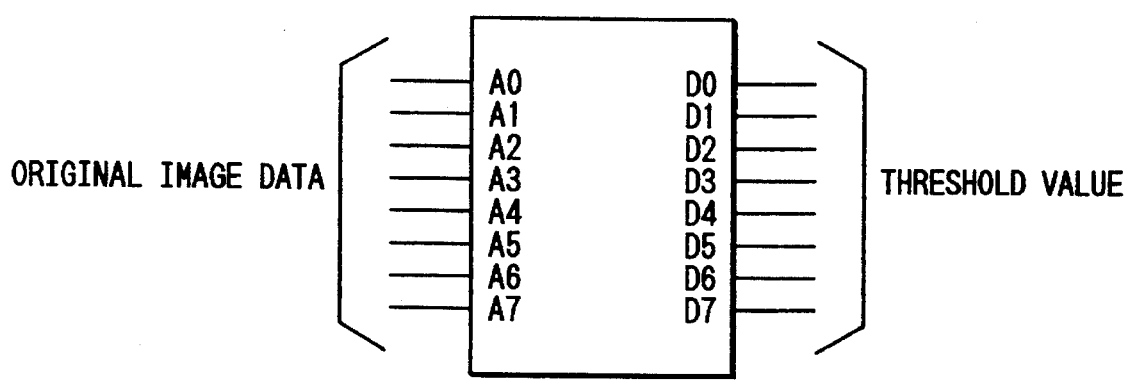
FIG. 11 is an explanatory diagram of the hardware construction of an example of the threshold setting means utilized in the present invention.

In the optimum threshold value setting means 32 in each of the previously mentioned embodiments, in order to set the threshold value from the original image data, a construction wherein calculation according to the previously mentioned Equation 1 is carried out each time is acceptable. Also acceptable is a construction wherein a conversion table in which the relationship between the original image data gradation values and threshold values has previously been stored is referenced. In FIG. 11 an actual example is shown of optimum threshold value setting means 32 constructed using a ROM. 8-bit original image data is input to the ROM address buses A0–A7, 8-bit threshold values corresponding to these are output from data buses D0–D7. Further, among the embodiments there is the example wherein a small amount of random noise is added to the binary coding threshold value set by the optimum threshold value setting means 32. In the case wherein the original image data is exceptionally systematic data drawn by a computer etc., this is to protect against a specific regular pattern being formed by the binary coding of the error diffusion method. Consequently, in the case of a natural image wherein the original image data contains moderate unevenness, adding random noise in this way is unnecessary. As a result of the addition of random noise it is possible that the threshold value may deviate from the range shown in Equation 6, however it is good if the threshold value lies within the range of Equation 6.

Further, even if the noise is added to the original image, not to the threshold value, the same result is obtained.

Other Embodiments

The present invention is still not limited to each of the previously mentioned embodiments, within the scope of the present invention all types of different embodiments are possible. For example, in a previously mentioned embodiment the case of density data wherein original image data became white by 0, black by 255 was taken as an example and explained, but needless to say the present invention can be applied in the same way in the case where there is brightness data wherein the original image data becomes black by 0 and white by 255.

Further, where the original image data takes values in the range A–B (A>B), in the case where this is binary coded into a or b (a< b), Equation 1 in the first Embodiment changes thus:

$$slsh(i,j) = (data\ (i,j) * (K-1) + (a+b)/2)/K \quad (1)$$

and it is desirable if Equation 2 changes in this fashion:

$$\text{if data } C(i,j) \geq slsh(i,j),\ \text{then result } (i,j) = a$$

$$\text{if data } C(i,j) < slsh(i,j),\ \text{then result } (i,j) = b. \quad (2)$$

Generally A= a and B= b, but in the case whereby the possible output density of the output apparatus differs greatly from the range of the original image data, there is an example where A and a, B and b do not match. In this case, with the conditional expression m=(a+b)/2 to set the threshold value of Equation 6, it becomes:

$$\text{when } data < m,\ data \leq slsh \leq (m+data)/2,$$

$$\text{when } data > m,\ (m+data)/2 \leq slsh \leq data \quad (8).$$

Further, in a previously mentioned embodiment the case of original image data 200 being corrected utilizing an error diffusion method was taken as an example and explained, but the present invention is not limited to that; a case wherein correction is done utilizing a minimum average error method can also be applied.

Figure 18:
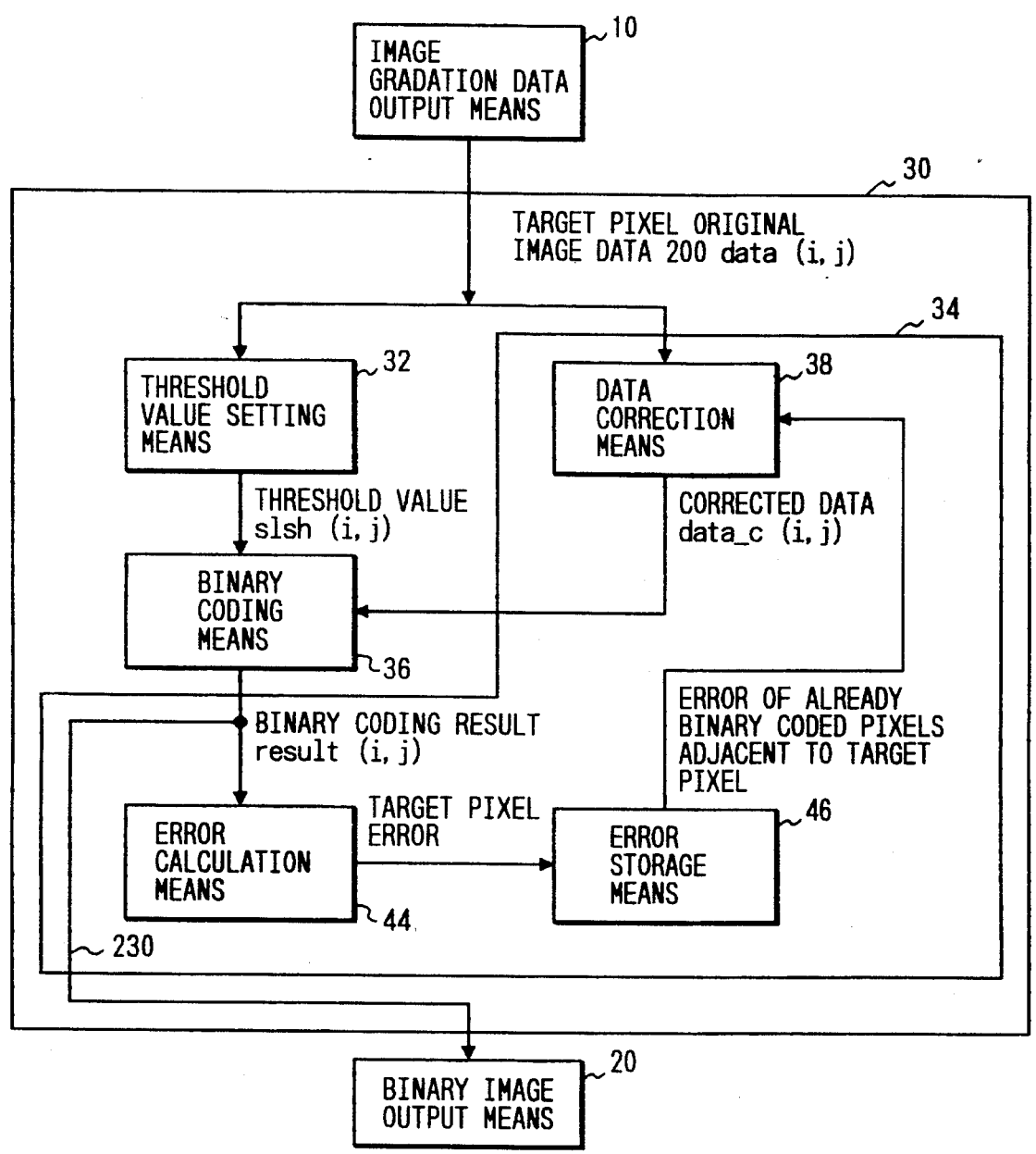
FIG. 18 is a block diagram of an embodiment of an image processing apparatus using a minimum average error method in correcting multigradation image data.

In FIG. 18, an ideal embodiment of image processing apparatus 30 utilizing an minimum average error method is shown. Further, as the same reference marks are attached to the parts corresponding to those in the embodiment shown in FIG. 2, that explanation has been omitted. In this embodiment error correction means 34 is constructed including data correction means 38, error calculation means 44 and error storage means 46. Said error calculation means 44 is constructed in such a way that it calculates the target pixel binary coding error err based on the previously mentioned Equation 3, and writes the value to the address in error storage means 46 corresponding to the target pixel. The result of this is that the binary coding errors of binary-coded pixels are written and stored one by one in the storage area corresponding to each pixel address of error storage means 46. The multigradation image data (i, j) of target pixel P [i, j] is input to data correction means 38 and the errors of the already binary-coded pixels proximate to this target pixel P [i, j] are read from error storage means 46. Next, the prescribed weighting is applied to the read error data and the average error is found, this average error is added to the target pixel multigradation image data (i, j), and this is output to the binary coding means 36 as corrected pixel data c (i, j).

Further, apart from this, as the construction is the same as the previously mentioned first embodiment, that explanation is omitted here. Also in this case, utilizing an minimum average error method, the same effect as that in the previously mentioned first embodiment can be achieved.

Advantages of The Invention

As explained above, in the present invention multigradation image data is corrected by an error diffusion method or a minimum average error method. Moreover, the image processing apparatus, by the provision of the threshold value setting means which optimizes the threshold value based on the gradation value of the target pixel image gradation value data, has the advantage of being able to fundamentally solve the development of the phenomenon of a large error volume accumulating in low density and high density areas, and the problems of delay in dot generation in beginning portions of areas of low and high density and tailing after completing areas of low and high density which are caused by the previously mentioned error accumulation, without accompanying side effects of quality depletion. Furthermore, because the threshold value setting means of the present invention is realized by a simple construction wherein just a simple calculation is performed or a comparison table is referenced. Both speedy and satisfactory image processing can be carried out without the need for a complicated processing circuit. Still further, by varying the threshold value set by the threshold value setting means of the present invention, adjustment of the speed of dot generation is possible and depending on the situation, by setting an over-correction condition, a secondary advantage, for example an edge intensification effect, can be obtained.

What is claimed is:

1. An image processing apparatus for converting multigradation image data into bigradation image data of a first and second gradation value comprising:

an error correction means to correct an input multigradation image data of a target pixel (data) by adding an error diffused from a proximal previously binary-coded pixel to said input to produce a corrected pixel data;

a threshold value setting means for setting a binary threshold value based on a gradation value of said input; and a binary coding means which accepts said binary threshold value and said corrected pixel data and outputs said bigradation image data based on said threshold value and said corrected pixel data; wherein said first and second gradation value have a median m and said threshold value setting means sets said binary coding threshold value slsh, satisfying at least one of the tolerance ranges shown in the following equations:

in the case where the value of input data is close to said first gradation value, data≦slsh≦((m+data)/2), and in the case where the value of input data is close to said second gradation value, ((m+data)/2)≦slsh≦data.

2. An image processing apparatus of claim 1 wherein said threshold value setting means, sets said binary threshold value slsh according to the following equation:

$$slsh=(data*(K-1)+m)/K,$$

provided that K is a constant expressed by an integer greater than 2.

3. An image processing apparatus of claim 1 wherein said threshold value setting means sets said binary threshold value slsh step by step.

4. An image processing apparatus of claim 1 wherein said threshold value setting means sets said binary threshold value slsh according to the following equations:

$$when\ data< m-L1,\ slsh=data+L1,$$

when $M-L1 < data < m+L2$, $slsh=m$ when $M+L2 < data$, $slsh=data-L2$ provided that L1, L2 are constants expressed by integers between 0–m.

5. An image processing apparatus, wherein the binary coding means of claims 1, 2, 3 or 4 adds random noise to at least one of said threshold value and said corrected pixel data.

6. An image processing apparatus of claims 1, 2, 3, or 4 wherein said error correction means further comprises:

a diffused error storage means for storing a diffused error total value for each pixel;

an error diffusion means for calculating a binary coding error, for diffusing said binary coding error to at least one non-binary-coded pixel proximate to the target pixel using an error diffusion method, calculating an updated diffused error total value for each proximate pixel by adding a predetermined portion of said binary coding error from said target pixel to the diffused error total value for each proximate pixel stored in said diffused error storage means;

and a data correction means for calculating said corrected pixel data by adding the target pixel multigradation image data and the diffused error total value for the target pixel;

and outputting said corrected pixel data.

7. An image processing apparatus of claims 1, 2, 3, or 4 wherein said error correction means further comprises:

an error storage means which stores each error information for each pixel;

an error calculation means for calculating a binary coding error and writing said binary coding error to said error storage means; and a data correction means for calculating an average error by reading the binary coding error for pixels proximate to the target pixel from said error storage means and applying a predetermined weighting for each proximal pixel; adding said average error to the input multigradation image data of the target pixel; and outputting corrected pixel data.

8. An image processing apparatus according to claim 5, wherein said error correction means further comprises:

a diffused error storage means for storing a diffused error total value for each pixel;

an error diffusion means for calculating a binary coding error, for diffusing said binary coding error to at least one non-binary-coded pixel proximate to the target pixel using an error diffusion method, calculating an updated diffused error total value for each proximate pixel by adding a predetermined portion of said binary coding error from said target pixel to the diffused error total value for each proximate pixel stored in said diffused error storage means;

and a data correction means for calculating said corrected pixel data by adding the target pixel multigradation image data and the diffused error total value for the target pixel; and outputting said corrected pixel data.

9. An image processing apparatus according to claim 5, wherein said error correction means further comprises:

an error storage means which stores each error information for each pixel;

an error calculation means for calculating a binary coding error and writing said binary coding error to said error storage means; and a data correction means for calculating an average error by reading the binary coding error for pixels proximate to the target pixel from said error storage means and applying a predetermined weighting for each proximal pixel; adding said average error to the input multigradation image data of the target pixel; and outputting corrected pixel data.

\* \* \* \* \*